US008260837B2

(12) United States Patent
Powell, Jr. et al.

(10) Patent No.: US 8,260,837 B2
(45) Date of Patent: *Sep. 4, 2012

(54) HANDLING DENORMAL FLOATING POINT OPERANDS WHEN RESULT MUST BE NORMALIZED

(75) Inventors: Lawrence Joseph Powell, Jr., Round Rock, TX (US); Martin Stanley Schmookler, Austin, TX (US); Son Dao Trong, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1017 days.

This patent is subject to a terminal disclaimer.

(21) Appl. No.: 12/234,890

(22) Filed: Sep. 22, 2008

(65) Prior Publication Data

US 2009/0077152 A1    Mar. 19, 2009

Related U.S. Application Data

(63) Continuation of application No. 11/055,046, filed on Feb. 10, 2005, now Pat. No. 7,451,172.

(51) Int. Cl.
*G06F 7/487* (2006.01)

(52) U.S. Cl. ....................................... 708/501

(58) Field of Classification Search ................... None
See application file for complete search history.

(56) References Cited

U.S. PATENT DOCUMENTS

| 5,204,825 | A  | 4/1993  | Ng |
| 5,317,527 | A  | 5/1994  | Britton et al. |
| 5,493,520 | A  | 2/1996  | Schmookler et al. |
| 5,757,687 | A  | 5/1998  | Naffziger et al. |
| 5,943,249 | A  | 8/1999  | Handlogten |
| 5,957,997 | A  | 9/1999  | Olson et al. |
| 6,275,838 | B1 | 8/2001  | Blomgren et al. |
| 7,254,698 | B2 | 8/2007  | Schwarz et al. |
| 7,290,023 | B2 | 10/2007 | Dhong et al. |
| 7,346,643 | B1 | 3/2008  | Ho et al. |
| 2005/0228844 | A1 | 10/2005 | Dhong et al. |

*Primary Examiner* — David H Malzahn
(74) *Attorney, Agent, or Firm* — Stephen R. TKacs; Stephen J. Walder, Jr.; Diana R. Gerhardt

(57) ABSTRACT

A system for handling denormal floating point operands when the result must be normalized. A leading zero counter (lzc) on the operand B (opB) is used to limit alignment shifts when opB is denormal but is much greater than the product of operands A and C, i.e. AC. By limiting the additional shift of B during normalization, by the number of leading zeros in opB, no increase is needed in the output bus of the alignment shifter. Furthermore, the additional shift may be done either in the alignment shifter, or postponed to a later stage in the pipeline, where the result is normalized.

3 Claims, 4 Drawing Sheets

HANDLING DENORMAL FLOATING POINT OPERANDS WHEN RESULT MUST BE NORMALIZED

This application is a continuation of application Ser. No. 11/055,046, filed Feb. 10, 2005, now U.S. Pat. No. 7,451,172.

BACKGROUND OF THE INVENTION

1. Technical Field

The present invention relates generally to an improved data processing system and method. In particular, the present invention provides a system and method for handling denormal floating point operands, in a binary floating point unit which executes "fused-multiply-add/subtract" instructions, when the result must be normalized.

2. Description of Related Art

To increase the speed and efficiency of real-number computations, floating point execution units in typical computers represent real numbers in a binary floating point format. In this format, a real number has three parts, a sign, a mantissa, and an exponent. The sign is a binary value that identifies whether the number is positive or negative. The mantissa is the numeric value which is multiplied by a base or radix raised to the power of the exponent, e.g., the mantissa of 145,000 is 145 ($145 \times 10^3$). The mantissa is represented as a one bit binary integer and a binary fraction. The one bit binary integer is often not represented but is instead an implied value. The exponent is a binary integer that represents the base-2 power that the mantissa is raised to.

In most cases, the floating point execution unit represents real numbers in normalized form. This means that, except for zero, the mantissa is always made up of an integer of 1 and the fraction 1.f... ff. For example, the normalized mantissa of the single precision representation for the ordinary decimal number 178.125 is represented by the floating point execution unit as 01100100010000000000000 (with the "1." implied). For values less than 1, leading zeros are eliminated. For each leading zero that is eliminated, the exponent is decremented by one, resulting in an exponent with a negative value.

The floating point execution unit represents exponents in a biased form. This means that a constant is added to the actual exponent so that the biased exponent is always a positive number or zero, even when its value is negative. The value of the biasing constant depends on the number of bits available for representing exponents in the floating point format being used, which depends upon which precision is used. The biasing constant is chosen so that the smallest normalized number can be reciprocated without overflow. In the above example, the biased single precision exponent for the decimal number 178.125 is represented as 10000110. Thus, in scientific notation, the number 178.125 is the combination of the normalized mantissa and the biased exponent, i.e. $1.011001000E_2 10000110$.

Non-zero, finite numbers may be either normalized or denormalized numbers. The normalized finite numbers comprise all the non-zero finite values that can be encoded in a normalized real number format. When real numbers become very close to zero, the normalized number format can no longer be used to represent the numbers. This is because the range of the exponent is not large enough to compensate for shifting the binary point to the right to eliminate leading zeros.

When the biased exponent is zero, smaller numbers can only be represented by making the integer bit and other leading bits of the mantissa zero. The numbers in this range are called denormalized (or tiny) numbers. The use of leading zeros with denormalized numbers allows smaller numbers to be represented. However, this denormalization causes a loss of precision, i.e. the number of significant bits in the binary fraction is reduced by the leading zeros.

When performing normalized floating point computations, a floating point execution unit typically operates on normalized numbers and produces normalized numbers as a result. Denormalized numbers represent an underflow condition. In order to address various unusual conditions which may arise and which affect the accuracy of the results, status and control bits are defined. Status bits are defined for each of several unusual conditions called exceptions, which includes underflow, overflow, and division by zero exceptions. Corresponding control bits are provided to either enable or disable traps to handle these exceptions. If an exception occurs and the trap is enabled, an interrupt is taken to a program which analyzes the specific exception and takes appropriate action. When the trap is not enabled, the status bit is set and execution continues. The status bit remains set for possible examination at a later time.

If the underflow trap is not enabled (UE=0) and an underflow exception occurs, then the result is denormalized. If the trap is enabled (UE=1), however, then IEEE standard 754-1985, which defines real number operations and the representation of real numbers, requires that the final result be normalized, even though its value is below the range of normalized numbers. Since its corresponding biased exponent would be smaller than zero, it is adjusted by adding a constant value to the exponent, thus making it greater than zero. The program or procedure which subsequently handles the exception can then subtract the constant to determine its real value.

Denormal operands may be encountered when the floating point execution unit executes "fused-multiply-add" and "fused-multiply-subtract" instructions. In a fused-multiply-add or -subtract instruction, three operands are provided, operand A, operand B, and operand C. With known fused-multiply-add or fused-multiply-subtract instructions in a floating point pipelined dataflow, such as one found in a PowerPC™ microprocessor, operands A and C are multiplied and operand B is added to or subtracted from the unrounded product AC. When B is smaller than AC, as determined from their exponents, the mantissa of B is shifted right with respect to the AC mantissa. When B is greater than AC, then the mantissa of B is shifted left with respect to AC. However, the mantissa of B only needs to be shifted far enough to the left to avoid any overlap between the AC mantissa and the B mantissa and its guard bit, which ensures proper rounding of the result. For double precision instructions, the mantissa and its guard bit consist of 54 bits. Therefore, when the B exponent exceeds the AC exponent by more than 56, i.e. expB>expAC+56, then the B mantissa is shifted left only 56 bits with respect to AC, providing a space of just 2 bit positions between them.

However, a problem may arise when the underflow exception is enabled (UE=1), since the final result must be normalized. The problem occurs when the three operands are all very small, such that B is denormal, and AC is much smaller than the smallest denormal number. Such a case is very rare, partly because denormal values seldom occur, and also because the denormal value must have been either an input value to the program, or else produced when underflow exceptions were not enabled (UE=0).

In such a case, B is much greater than AC, and is therefore placed to its left. However, since it is denormal, it has leading zeros which must be removed. If the final result is normalized by shifting B and AC together to the left to remove the leading zeros, part of AC may be shifted into the lower order bits of the result. To get the proper result, B may need to be placed more than 56 bits left of AC to be properly aligned. For the extreme case where B consists of 52 leading zeros in its integer bit 7 and fraction, with just a 1 in its least significant bit position (this value is the minimum denormal number), then B may need to be shifted left by up to 52 bit positions. This would make the output bus of the alignment shifter considerably wider, i.e. by 52 bits.

In known PowerPC™ implementations, a wider alignment shifter is avoided by first normalizing B when it is denormal if the underflow exception is enabled. The normal floating point processing is halted immediately while B is sent through the pipeline by itself and normalized prior to performing the multiply-add operation described above. The exponent is adjusted to compensate for normalizing the mantissa, but the corresponding exponent value is outside of the range that can be represented with the 11-bit field. Therefore, a wider exponent field, typically 13 bits, is used during execution to accommodate various intermediate results that are outside of the architected range.

Thus, in known systems, the processing of the pipeline must be halted temporarily to handle a denormal B operand. With the current trend to increase frequency of processors beyond what the improvements in processor and circuit technology would provide, it becomes more difficult to halt the pipeline. By the time the special condition is detected, a subsequent instruction is already on its way to the floating point unit.

Therefore, it would be beneficial to have an improved system and method for handling denormal floating point operands when the result must be normalized. More specifically, it would be beneficial to have a system and method that eliminates the need for either prenormalizing the input B operand or providing a wider alignment shifter and bus.

SUMMARY OF THE INVENTION

In one illustrative embodiment, a system is provided for processing an instruction having denormal floating point operands. The system comprises a multiplier, first, second and third input lines for inputting a first operand, a second operand, and a third operand of the instruction, and an alignment shifter coupled to the second input line. The alignment shifter receives a mantissa of the second operand via the second input line. The system further comprises an exponent calculator coupled to the first, second and third input lines. The exponent calculator receives an exponent portion of the first operand, the second operand, and the third operand via the first, second and third input lines, a compare/select unit coupled to the leading zero counter and the exponent calculator, and a leading zero counter coupled to the second input line. The alignment shifter receives the mantissa of the second operand via the second input line. The leading zero counter determines a first shift amount of the mantissa of the second operand based on a number of leading zeros in the mantissa of the second operand. The exponent calculator determines a second shift amount of the mantissa of the second operand based on exponents of the first operand, the second operand, and the third operand. The compare/select unit compares the first shift amount to the second shift amount. The compare/select unit determines if a negative value of the second shift amount is less than the first shift amount. The compare/select unit sets the third shift amount equal to the second shift amount if the negative value of the second shift amount is less than the first shift amount. The compare/select unit sets the third shift amount equal to the first shift amount if the negative value of the second shift amount is not less than the first shift amount. The alignment shifter shifts the mantissa of the second operand by the third shift amount and the shifted mantissa of the second operand is normalized to generate a normalized result for the instruction. Generating a normalized result for the instruction based on the shifted mantissa of the second operand and a product of the first and third operands comprises generating an intermediate result based on the shifted mantissa of the second operand and the product of the first and third operands, generating a normalize shift amount based on the third shift amount, and normalizing the intermediate result based on the normalize shift amount. The normalize shift amount is the sum of the third shift amount and the number of leading zeros of the mantissa of the second operand.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
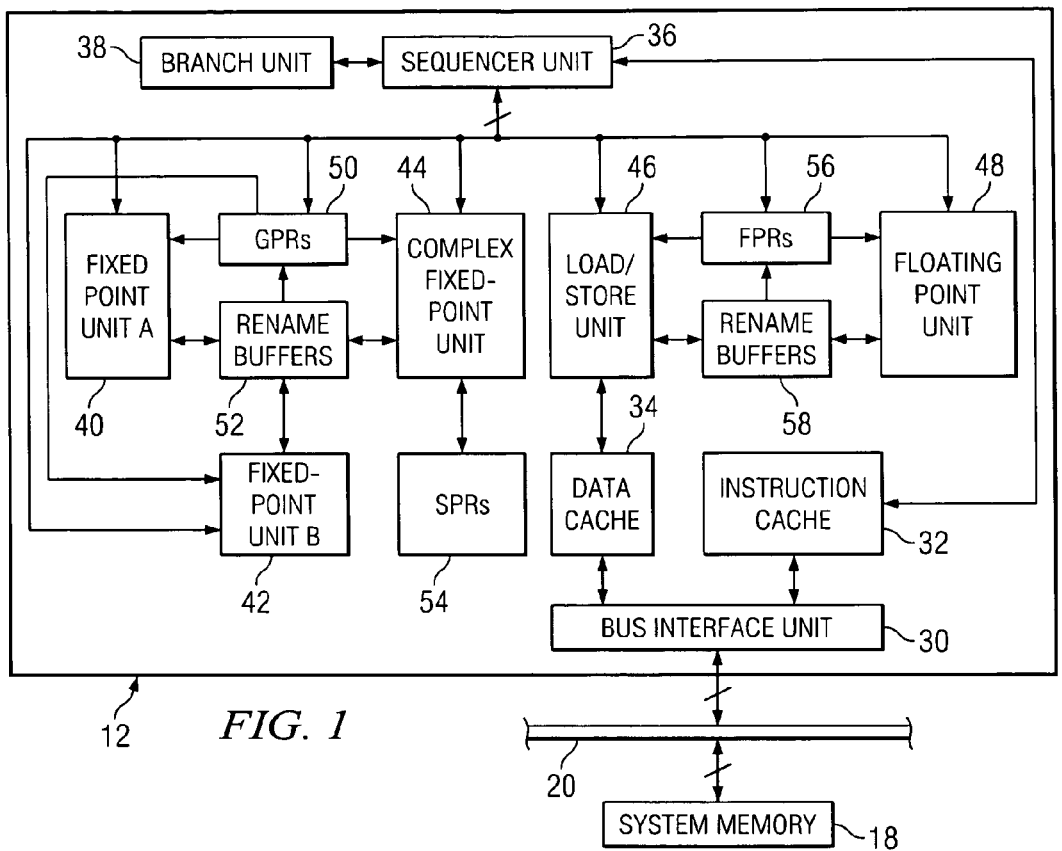
FIG. 1 is an exemplary block diagram of a processor in which an exemplary embodiment of the present invention may be implemented.

As mentioned above, the present invention is directed to an improvement in the floating point execution unit, or floating point unit, of a processor so that denormal operands are handled in a more efficient manner, when normalization is required, than in known systems. One exemplary architecture in which the present invention may be implemented is the PowerPC™ microprocessor architecture. FIG. 1 is provided as an illustrative embodiment of a processing unit architecture for a PowerPC™ microprocessor manufactured by International Business Machines Corporation. It should be appreciated that the architecture shown in FIG. 1 is only exemplary and is not intended to state or imply any limitation as to the architectures in which the present invention may be implemented. Many modifications to the architecture shown in FIG. 1 may be made without departing from the spirit and scope of the present invention.

PowerPC™ microprocessor 12 operates according to reduced instruction set computing (RISC) and is a single integrated circuit superscalar microprocessor. The system bus 20 is connected to a bus interface unit (BIU) of microprocessor 12. Bus 20, as well as various other connections described, include more than one line or wire, e.g., the bus could be a 32-bit bus.

BIU 30 is connected to an instruction cache 32 and a data cache 34. The output of instruction cache 32 is connected to a sequencer unit 36. In response to the particular instructions received from instruction cache 32, sequencer unit 36 outputs instructions to other execution circuitry of microprocessor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand data from general-purpose registers (GPRs) 50 and fixed-point rename buffers 52. The outputs of FXUA 40, FXUB 42, CFXU 44 and LSU 46 send destination operand data for storage to selected entries in fixed-point rename buffers 52. CFXU 44 further has an input and an output connected to special-purpose registers (SPRs) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in rename buffers 58.

Microprocessor 12 may include other registers, such as configuration registers, memory management registers, exception handling registers, and miscellaneous registers, which are not shown. Microprocessor 12 carries out program instructions from a user application or the operating system, by routing the instructions and data to the appropriate execution units, buffers and registers, and by sending the resulting output to the system memory device (RAM), or to some output device such as a display console.

The present invention is directed to improving the manner by which floating point instructions, and the operands associated with these floating point instructions, are processed by a floating point unit, such as floating point unit 48. The representation of floating point values and the floating point operations are defined in the IEEE Standard 754-1985, "IEEE Standard for Binary Floating-Point Arithmetic". The standard describes both single and double precision values, and also provides for other precisions such as double-extended. However, although the exemplary embodiments described in the present invention are directed to the use of double precision floating point values, the mechanisms they describe could easily be applied to other precisions also. The "fused-multiply-add/subtract" instructions are an extension to the operations described in the IEEE standard, and are described in the IBM PowerPC™ processor Instruction Set Architecture.

Exemplary embodiments of the present invention are directed to a mechanism for handling a denormal floating point add operand, for a "fused-multiply-add/subtract" instruction in a floating point pipelined dataflow when the result must be normalized. In an exemplary embodiment, the mechanisms of the present invention may be implemented, for example, in, or in association with, floating point execution unit 48. With the present invention, assuming three floating point operands A, B and C, and that a "fused-multiply-add" or "fused-multiply-subtract" instruction is being processed, a leading zero counter (lzc) is used to count the number of leading zeros in operand B. A shift amount determined based on this count is compared to a shift amount determined based on the exponents of operands A, B and C to thereby determine a shift amount that is to be used to control the shifting by an alignment shifter. The alignment shifter then shifts the operand B by the shift amount determined from this comparison, hereafter referred to as the B shift amount, or BSA. The result from the alignment shifter is then added to, or subtracted from, the product AC of operands A and C, to generate a normalized value for the "fused-multiply-add" or "fused-multiply-subtract" instruction.

Figure 2:
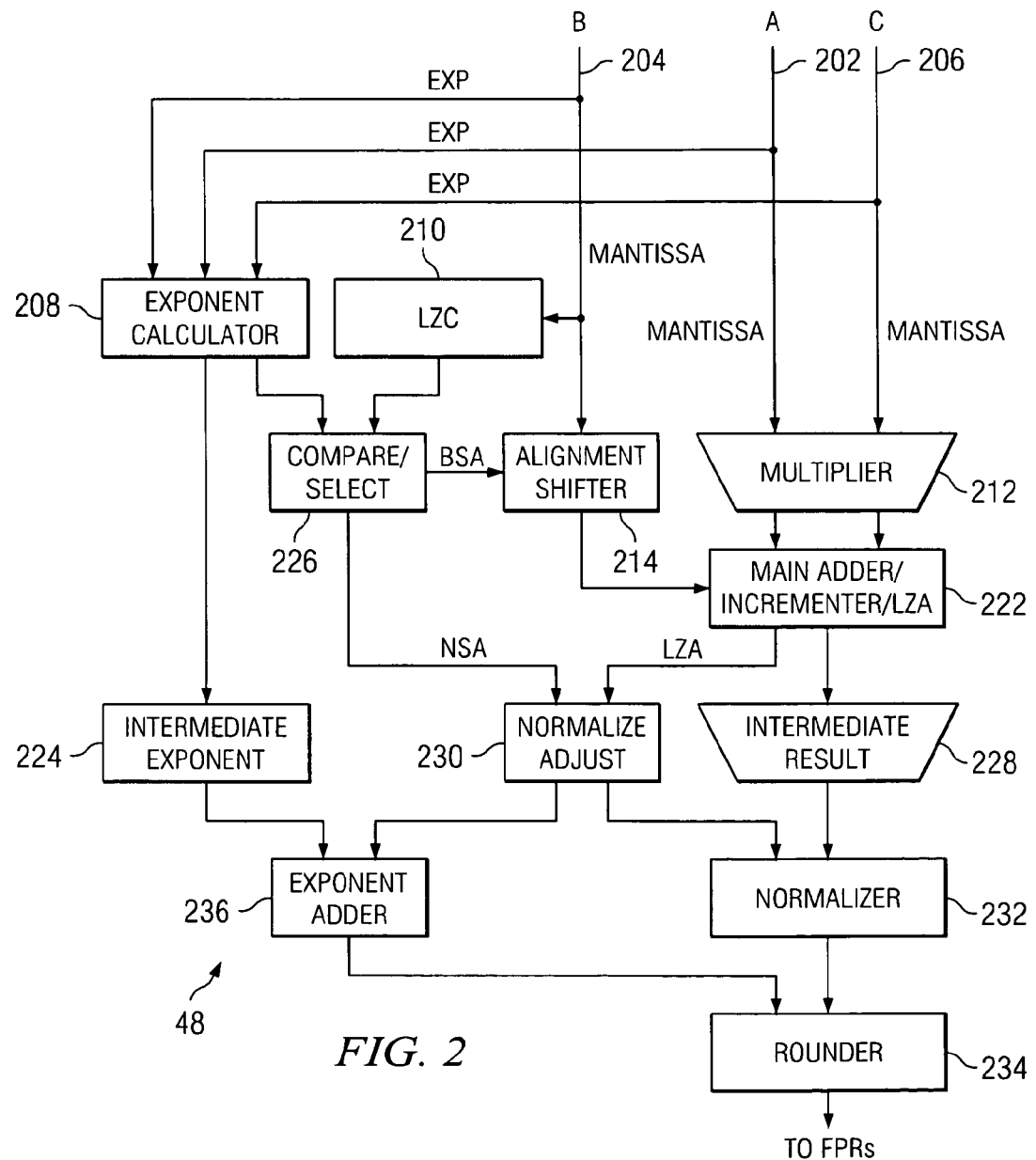
FIG. 2 is a high level block diagram of the floating point execution unit in accordance with exemplary embodiments of the present invention.

FIG. 2 is a high level block diagram of the floating point execution unit in accordance with an exemplary embodiment of the present invention. As shown in FIG. 2, floating point execution unit 48 includes inputs 202, 204, and 206 for receiving operands A, B, and C, respectively, expressed as floating point numbers. Floating point execution unit 48 uses these operands when executing the "fused-multiply-add" and "fused-multiply-subtract" instructions. The fused-multiply-add instruction executes the arithmetic operation (A*C)+B, while the fused-multiply-subtract instruction executes the arithmetic operation (A*C)−B. The exponent portions of operands A, B, and C received at inputs 202, 204, and 206 are provided to exponent calculator 208. The mantissa portions of operands A and C are provided to multiplier 212, while the mantissa portion of operand B is provided to alignment shifter 214 and leading zero counter (lzc) 210.

Multiplier 212 receives the mantissas of operands A and C and reduces the arithmetic function (A*C) to the sum of two intermediate results, known as "sum" and "carry." These intermediate results are provided to main adder/incrementer/leading zero anticipator (LZA) 222. Exponent calculator 208 calculates an intermediate exponent from the sum of the exponents of operands A and C or, in an alternative embodiment in which there is a connection from lzc 210 to exponent calculator 208, using the exponent of operand B and the lzc count 210 and stores the intermediate exponent in intermediate exponent register 224. Exponent calculator 208 also calculates the difference between the intermediate exponent and the exponent of operand B and provides the difference value to the compare/select unit 226. The compare/select unit 226 compares a shift amount determined based on the exponent difference to a shift amount determined based on the lzc 210 count and selects either the exponent difference or the lzc 210 count to be the basis for the shifting of the mantissa of operand B, i.e. the value of the BSA. In another alternative embodiment, rather than having compare/select unit 226, the functions of the compare/select unit 226 may be integrated into exponent calculator 208 which may generate three outputs, i.e. an intermediate exponent, the B shift amount (BSA) and normalize shift amount (NSA).

In most cases, i.e. where operand B is neither too much larger nor too much smaller than AC, the alignment shifter 214 shifts the mantissa of operand B so that the exponent of operand B, adjusted to correspond to the shifted mantissa, equals the intermediate exponent 224. The shifted mantissa of operand B is then provided to main adder/incrementer/LZA 222. Main adder/incrementer/LZA 222 adds the shifted mantissa of operand B to the sum and carry results of multiplier 212 to generate an intermediate result of the fused-multiply-add/subtract instruction. The output of main adder/incrementer/LZA 222 is stored in intermediate result register 228.

When the instruction and signs determine that operand B is to be effectively subtracted from AC, the alignment shifter also complements B. If, in this case, B is also greater than AC, then the result from the adder/incrementer/LZA 222 must be recomplemented.

The alignment shifter 214 receives the mantissa of operand B and a control signal from compare/select unit 226. The control signal is the BSA determined based on one of the exponent difference and the lzc count, dependent upon which basis is selected by the compare/select unit 226. The alignment shifter 214 shifts the mantissa of operand B based on the BSA and generates an output that is added to AC in main adder/incrementer/LZA 222.

Main adder/incrementer/LZA 222 generates an intermediate result by adding the alignment shifter output to the sum and carry inputs from multiplier 212, as discussed above. In addition, the leading zero anticipator (LZA) of the main adder/incrementer/LZA 222 outputs data indicative of the anticipated number of leading zeros to normalize adjust register 230. Moreover, the compare/select unit 226 generates a normalize shift amount (NSA) based on the BSA and the lzc count, which is output to the normalize adjust register 230. The normalize shift amount may be, for example, the sum of the BSA and the lzc.

Depending on the particular circumstances, either the NSA or the LZA is placed into normalize adjust register 230 to be used by the normalizer 232 to normalize the intermediate result from intermediate result register 228. Normalization involves shifting of the intermediate result based on the normalizer adjust to eliminate leading zeros. The exponent adder 236 also uses the normalizer adjust to adjust the intermediate exponent 224 to be consistent with the normalized intermediate result generated by normalizer 232. The results of the exponent adder 236 and the normalizer 232 are provided to rounder 234 for rounding in accordance with a specified rounding mode. The rounder 234 may also perform fine adjustment of the exponent from exponent adder 236, such as incrementing it when rounding causes a carry out of the integer bit of the mantissa. The rounded result from rounder 234 is then output to the floating point registers for use by the processing units of the microprocessor.

The NSA is used for the normalize adjust when the leading significant bit of the result from the alignment shifter is at least two bit positions to the left of AC. For such cases, not only is operand B larger in magnitude than AC, but the leading bit of the intermediate result must correspond to the leading bit of operand B. Therefore, its position is determined from how far it was shifted during alignment, and also from the number of leading zeros (lzc count) in operand B. For these cases, the NSA is placed into the normalize adjust register 230. A carry or borrow into that leading bit position due to addition or subtraction in the main adder/incrementer/LZA 222 could move the leading bit of the intermediate result by one position to the left or right, respectively. Therefore, after the NSA is used by the normalizer to shift the intermediate result, an additional one bit correction may be needed. This is usually determined by examining the leading bits after shifting.

When the leading significant bit of the alignment shifter output is further to the right than as described above, thus corresponding to cases where either B is smaller than AC or else is not too much larger, then the leading bit of the intermediate result and the corresponding normalizer adjustment are determined from the main adder/incrementer/LZA 222 or its inputs, using the leading zero anticipator. For these cases, the BSA for the alignment shifter is determined based on the difference of the exponents of the operands A, B and C. The LZA output from main adder/incrementer/LZA 222 provides an indication of the anticipated number of leading zeros in the intermediate result, which is then stored in normalize adjust register 230. This corresponds to the normal case in which the additional mechanisms of the present invention are not necessary for handling denormal operands. For more information regarding the operation of the leading zero anticipator, reference is made to U.S. Pat. Nos. 5,957,997, 5,204,825, 5,317,527, and 5,493,520, which are hereby incorporated by reference.

The present invention primarily pertains to the very rare cases where AC is so much smaller than B, such that when properly aligned based on their exponents, they do not overlap or even touch. The additional mechanisms of the present invention may be used when B is not normalized, and also when the output result needs to be normalized, such as when the underflow trap is enabled. A later part of this description shows the method to be used for calculating a shift amount sh_amt for aligning B with AC based on the difference in their exponents.

As discussed hereafter, for all cases that pertain to the present invention, the sh_amt is less than 0, i.e. sh_amt is negative. This value is compared with the lzc count. If $-(sh\_amt) < lzc$, then for all embodiments of this invention, the BSA is set to sh_amt. When this is a negative value, it corresponds to a left shift with respect to a reference point rather than a right shift.

When $-(sh\_amt) > lzc$, the B mantissa does not need to be shifted further left than the value lzc. There are several embodiments described for handling this case.

In a first embodiment, when $-(sh\_amt) > lzc$, the BSA is set to the negative of the lzc count, i.e. BSA=-lzc. As a result, the normalize shift amount, which in this embodiment is the sum of the BSA and the lzc count, is set to zero, i.e. NSA=(-lzc)+lzc=0. This corresponds to the fact that the intermediate result generated by the main adder/incrementer/LZA 222 would be already normalized.

In another embodiment of the present invention, when $-(sh\_amt)$ is $> lzc$, the BSA is set to zero such that the shifting is performed in the later normalization stage. Thus BSA=0 and NSA is set to the lzc count value, i.e. NSA=0+lzc=lzc.

Referring again to FIG. 2, the value that is stored in the normalize adjust register 230 is referred to as the normalize adjustment. The normalize adjustment from normalize adjust register 230 is provided, together with the intermediate result mantissa from intermediate result register 228, to normalizer 232. Normalizer 232 performs the shifting required to place the leading one of the mantissa of operand B into the most significant bit position of the result mantissa. The shifted mantissa is then provided to rounder 234, which rounds the result mantissa to the appropriate number of bits. The mantissa may be either rounded up or down according to a specified "rounding mode."

The normalize adjustment from normalize adjust register 230 is also provided to exponent adder 236 which uses the normalize adjustment to determine a final exponent. The final exponent is provided to rounder 234 where it is combined with the final result mantissa from the rounder 234 and forwarded to the floating point registers, such as floating point registers 56.

As discussed above, leading zero counter (lzc) 210 counts the number of leading zeros of the mantissa of operand B. This leading zero count is used in determining a shift amount for shifting the mantissa of operand B, in accordance with the present invention. In the depicted embodiment, the compare/select unit 226 compares a shift amount determined based on the leading zero count from the lzc 210 with the shift amount determined from the difference of the exponents of the product AC and the operand B. Based on this comparison, a determination is made as to whether the amount by which to shift the mantissa of operand B should be determined based on the shift amount determined from the exponents, i.e. sh_amt, or the lzc count.

With regard to determining a shift amount for the mantissa of operand B, and using the left boundary of the alignment shifter 214 as a reference point, then the shift amount of operand B may be defined as a right shift from that reference point, which is 55 bits to the left of the 106 bit AC product. The product includes two integer bits while operand B only includes one integer bit. Therefore, the shift amount is calculated as:

$$sh\_amt = expAC - expB + 56 = expA + expC - expB + 56$$

A negative value of sh_amt means that operand B should be shifted to the left of the reference point, causing some bits to spill past the left boundary of the alignment shifter 214. When operand B is normalized, then it is not permitted to be shifted left, and instead is placed at the left boundary, corresponding to a shift amount of zero. However, if operand B is a denormalized number, then it can be shifted left up to the number of leading zeros without losing any significant bits. Thus, if $-sh\_amt < lzc$ count, then parts of AC should be allowed to be shifted into the result fraction, and the placement of operand B is determined by the exponent difference. This is the normal case, where the exponent difference alone is used to align operand B. If $-sh\_amt > lzc$ count, then none of AC should be shifted into the result fraction, and the placement of operand B is determined by the lzc 210 count.

In an exemplary embodiment, the present invention permits negative shift amounts up to −52, but no bits would be saved to the left of the boundary. If the shift amount for the alignment shifter is calculated as zero or less, and if B is not a denormal operand, then a shift amount of zero is used, and B is placed at the left boundary. This corresponds to where the B exponent is at least 56 greater than the AC exponent, so that the AC product lies entirely to the right of B and its guard bit. However, if B is a denormal operand, and the final result must be normalized, then normalization of the intermediate result may pull some of the AC bits into the final result.

As an example, assume that operand B is a denormal operand with 32 leading zero bits. Assume also that the operand B exponent is 82 greater than the AC exponent. Thus, when B and AC are properly aligned, a space of 28 bits exists between the operand B least significant bit and the AC most significant bit (82−52−2 bits of AC to the left of the binary point=28). Normalization will shift this intermediate result left 32 bit positions, pulling 4 bits from AC into the mantissa, and one bit into the guard bit position. In order to properly align operand B before this normalization shift, the operand B mantissa must be shifted left with respect to the left boundary by 26 bit positions (82−56=26). Since the lzc count indicates that there are 32 leading zeros, a shift left of 26 bit positions can be made without spilling past the boundary.

If, on the other hand, the operand B exponent is 95 greater than the AC exponent, corresponding to a shift left of 95−56=39 bit positions (7 past the boundary), then the shift may be limited to no more than 32 bit positions to avoid losing any significant bits. This may be done in such a manner as to not increase the delay of alignment. Since the lzc count is less than the exponent difference, normalization should not pull any bits from the AC product into the final result.

In one exemplary embodiment of the present invention, when $-sh\_amt > lzc$ count, the operand B is shifted left based on the value of lzc and the normalizer shift amount is set to zero. In such an embodiment, either the lzc 210 is selected for the BSA to control the alignment shifter 214 directly, or the calculated value sh_amt controls the alignment shifter while a separate smaller shifter is used that is controlled only by lzc 210 and the output of this smaller shifter is then multiplexed with the output from the alignment shifter.

In an alternative exemplary embodiment, the BSA is set to zero, which places B at the left boundary during alignment. Then, when the intermediate result reaches the normalizer stage which is after the adder stage, the lzc 210 count is used to shift just the upper 53 bits to the left, removing the leading zeros, i.e. the normalizer shift amount (NSA) is set to the lzc count. Alternatively, the lower portion of the intermediate register which corresponds to the AC product can be set to 0s when the effective operation is a multiply-add, thus 0s would fill in the bits on the right of the normalized operand B. It will be shown in an example hereafter, that when the effective operation is a multiply-subtract, the lower portion of the intermediate register should be set to 1s to fill in the bits on the right of the normalized operand B.

Referring again to FIG. 2, in a first exemplary embodiment, exponent calculator 208 determines a shift amount, i.e. sh_amt, based on the exponent difference of the exponents of operands A, B and C which is then provided to compare/select unit 226. In addition, lzc 210 provides a leading zero count to the compare/select unit 226. The sh_amt determined based on the exponent difference and the shift amount determined based on the lzc count are compared to determine which is to be used as a basis for generating the binary shift amount to be output to the alignment shifter 214.

In one exemplary embodiment of the present invention, the smaller of the two values is determined and used based on the results of the comparison. That is, if $-(sh\_amt) < lzc$, then the exponent difference is used as the basis for the BSA. If it is determined that $-(sh\_amt) > lzc$, then the BSA is determined based on the lzc or is set to zero. In the case where the BSA is set to the negative of the lzc count, the normalizer shift amount is set to zero. In the case where the BSA is set to zero, the normalizer shift amount is set to the lzc count. These two alternatives amount to the shifting of the mantissa of operand B being performed either in the alignment shifter 214 stage or in the normalizer 232 stage.

In the case of the shifting being performed by the alignment shifter 214, the intermediate result generated by the main adder/incrementer/LZA 222 is already normalized by the shifting based on the lzc count. As a result, the normalizer shift amount is zero.

In the case of the shifting being performed in the normalizer 232 stage, the normalizer shift amount is set to the lzc count which causes the normalizer 232 to shift the mantissa of the intermediate result by the lzc count. In addition, the intermediate exponent is updated based on this lzc count in the exponent adder 236.

In the normalizer 232, the control for normalizing the intermediate result may be separated into an upper bit control and a lower bit control. For example, the upper bit control controls the shifting of the upper 53 bits while the lower bit control controls the shifting of the lower 110 bits.

In those cases where the alignment shifter 214 should have used the lzc count to shift the mantissa of operand B, i.e. when $-(sh\_amt) > lzc$ however the BSA was set to zero, the lzc count is used by the upper bit control of the normalizer 232 to shift only the upper bits, e.g., the upper 53 bits, of the mantissa of the intermediate result of the fused-multiply operation. In other words, the normalizer 232 uses the normalize shift amount, which has been set to the lzc count value, to shift the upper 53 bits of the mantissa of the intermediate result. All of the AC product can be shown to be part of the sticky bit and should not be shifted into the final result.

That is, all of the bits in the precise result which are to the right of the least significant bit of the final result can be merged into a single bit called the "sticky bit." When all of AC is smaller than the least significant bit of operand B, the AC product can be replaced by setting the sticky bit to one. Technically, this bit is either added to or subtracted from operand B, depending on the signs of the operands and whether the operation is a fused-multiply-add or fused-multiply-subtract. For example, for positive operands and a fused-multiply-add instruction, the sticky bit signifies that the precise result is slightly larger than operand B. If the rounding mode requires a "round up," then it must be incremented by adding 1 to the least significant bit. On the other hand, for a fused-multiply-subtract instruction, the precise result is slightly smaller than operand B. If the rounding mode requires a "round down," then it must be decremented by subtracting 1 from the least significant bit.

Thus, when the effective operation for this embodiment is a fused-multiply-subtract, then the operation essentially is subtracting a sticky bit from operand B. This subtraction will result in operand B decremented by 1 followed by a string of 1's. When operand B is shifted left by the normalizer, bits must be filled in from the right with 1's. In the general case, the signal "eff_sub" may be used to fill in the right with 1's. This will produce the same result as if operand B were shifted by the alignment shifter 214 prior to the main adder/incrementer/LZA 222.

In the case where the effective operation is a fused-multiply-add, then bits must be filled in from the right with 0's. A similar procedure may be used to fill in the right side bits with 0's as is used for filling in the rights side with a string of 1's.

This filling in may be performed by the lower bit control of normalizer 232, for example. Alternatively, rather than modifying the normalizer 232 to fill in with 0's or 1's the AC product stored in intermediate result 228 may be forced to be either all 0's or all 1's. This may be easily performed in the "recomplement" stage, which is essentially a 2-way multiplexer (mux), without much increase in delay. If the 2-way mux is implemented as an AND-OR mux, then forcing both selects to either 0's or 1's would be sufficient to implement forcing the AC product to either all 0's or all 1's without having to modify the mux circuit. Alternatively, if the 2-way mux is not an AND-OR mux, a port may be added to the mux for the high order 51 bits of AC in order to implement this operation.

It should be noted that for this case, a carry will always issue from the 108 bit adder of the adder/incrementer/LZA 222, incrementing the upper 53 bits which have been complemented. Also, the final 161 bit adder/incrementer/LZA 222 result must be recomplemented, since the exponent of operand B is greater than the exponent of the product AC. This has the effect of decrementing the original operand B.

As an example to illustrate how this embodiment generates the same result as if the mantissa of operand B is shifted prior to the main adder/incrementer/LZA 222, consider an operand B mantissa that is a denormal operand with 40 leading zeros, x'0.0 0000 0000 1FF5'. The following illustrates the values obtained when the mantissa of operand B is shifted prior to the main adder/incrementer/LZA 222:

| | |
|---|---|
| opB normalized | x'1.F F500 0000 0000' |
| complement B | x'0.0 0AFF FFFF FFFF' |
| increment | x'0.0 0B00 0000 0000' |
| recomplement | x'1.F F4FF FFFF FFFF' |

The following illustrates the values obtained when shifting only the upper 53 bits by a shift amount determined based on the lzc count and then filling in the right with 1's, for a fused-multiply-subtract operation:

| | | |
|---|---|---|
| opB unshifted | x'0.0 0000 0000 1FF5' | |
| complement B | x'1.1 FFFF FFFF E00A' | |
| increment | x'1.1 FFFF FFFF E00B' | |
| recomplement | x'0.0 0000 0000 IFF4' | AC forced to 1's (x'F's) |
| left 40 fill w/1s | x'1.F F4FF FFFF FFFF' | |

In each of the above embodiments, the calculations for the intermediate exponent, such as in element 224, are essentially the same as they are in normal cases. In one exemplary embodiment, when the alignment shift amount is based on the exponents of operands A, B and C, regardless of whether the shift is left or right, the intermediate exponent is determined by:

$$\text{int\_exp} = \exp(AC) + 56$$

This value is adjusted by the normalize shift amount. When the alignment shift amount is forced to zero, then the intermediate exponent is determined as follows:

$$\text{int\_exp} = \exp(B)$$

Note that when operand B is a denormal operand, exp(B) is emin and thus, int_exp=emin. During normalization, the exponent will be adjusted, resulting in exp_adj=emin–lzc. When operand B is normal, then lzc=0 and if the shift amount based on the exponents of operands A, B and C is negative, then the shift amount will be forced to zero.

Figure 3:
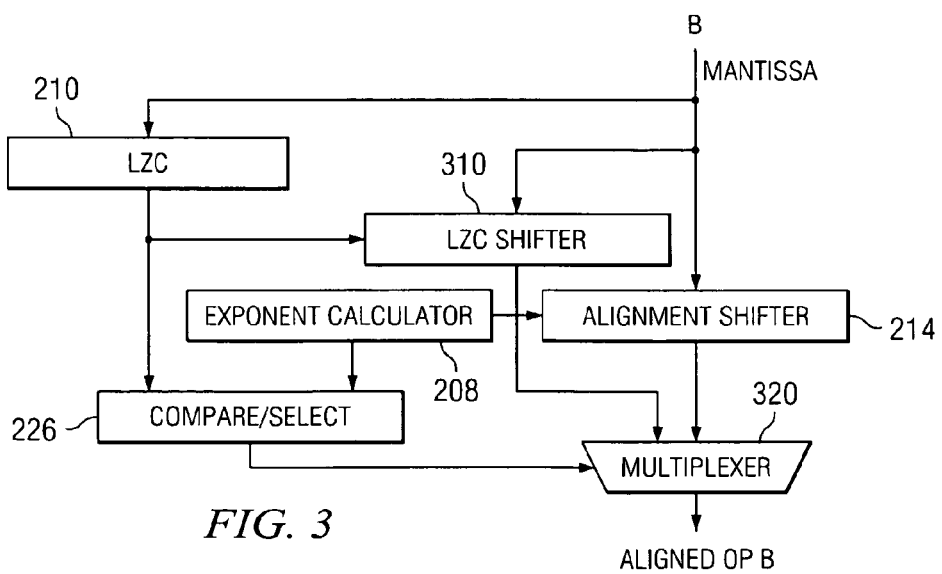
FIG. 3 is an exemplary block diagram of a portion of a floating point execution unit in which a separate lzc shifter and multiplexer are utilized.

FIG. 3 illustrates another exemplary embodiment of the present invention in which a separate shifter that is controlled only by the leading zero counter is utilized with its result being multiplexed with the output of the alignment shifter. As shown in FIG. 3, this alternative embodiment includes the leading zero counter (lzc) 210, an exponent calculator 208, a compare/select unit 226, an alignment shifter 214, a lzc shifter 310 and a multiplexer 320. The exponent calculator 208, lzc 210, compare/select unit 226 and alignment shifter 214 operate in a similar manner to the similarly numbered elements in FIG. 2. The mantissa of operand B is provided to the lzc 210, the lzc shifter 310, and the alignment shifter 214. The lzc 210 determines a number of leading zeros in the mantissa of operand B and provides this count as a control input to lzc shifter 310 as well as to compare/select unit 226. The lzc shifter 310 generates a shifted mantissa for operand B based on the lzc 210 count and outputs the shifted mantissa to multiplexer 320.

The compare/select unit 226 compares the lzc to the shift amount determined based on the exponents of the operands, as obtained from exponent calculator 208. Based on the comparison, either a shift amount based on the exponent difference of the operands or a shift amount based on lzc 210 count is selected. The selected shift amount is sent as a selector signal to multiplexer 320. based on the selected shift amount, the multiplexer 320 either outputs the shifted mantissa of operand B as obtained from alignment shifter 214 or the shifted mantissa of operand B as obtained from lzc shifter 310. This output is then provided to main adder/incrementer/LZA 222. The remainder of the operation of the floating point unit is similar to that of FIG. 2 above.

Figure 4:
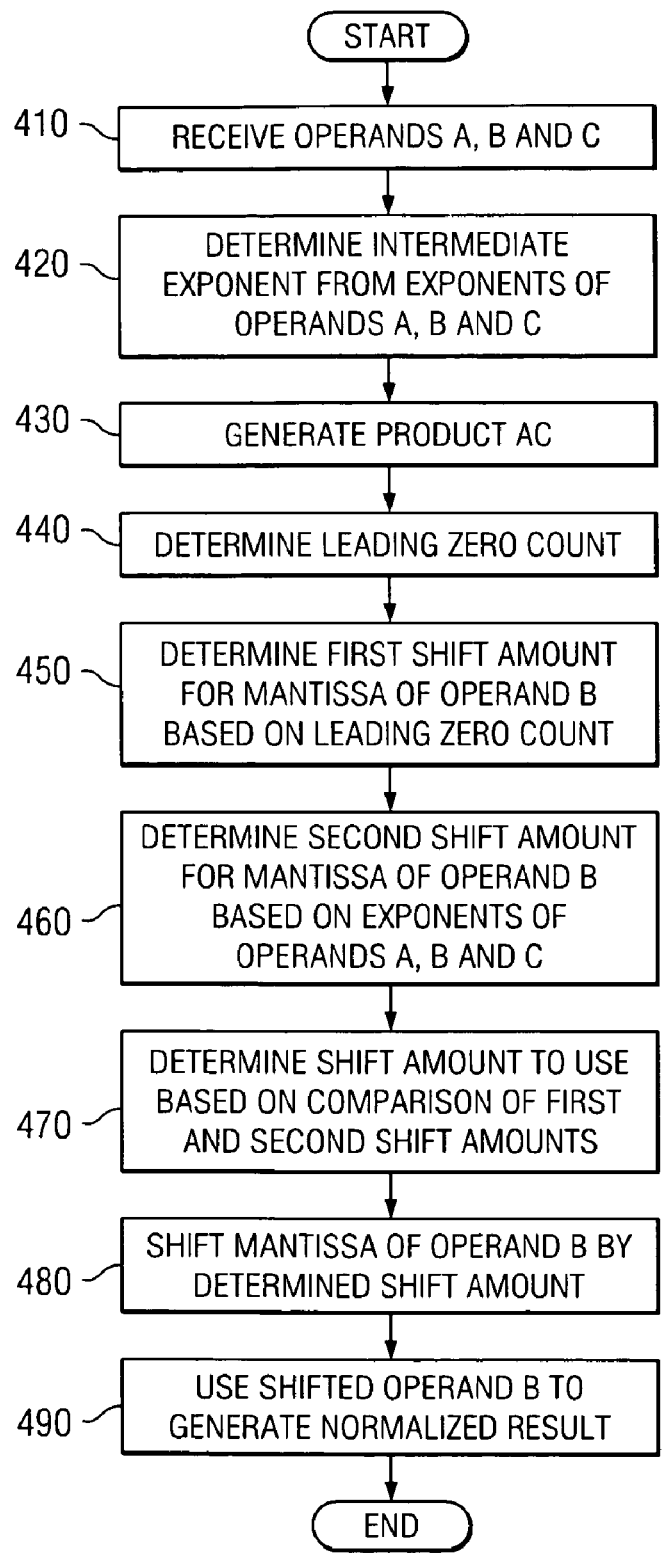
FIG. 4 is a flowchart outlining an exemplary operation of the present invention.

FIG. 4 is a flowchart outlining an exemplary operation of the present invention. It should be noted that while FIG. 4 illustrates a sequential order of operations, the present invention is not limited to such. Rather, many of the operations described in FIG. 4 may be performed in a different order, in parallel with other operations in FIG. 4, or the like, without departing from the spirit and scope of the present invention.

As shown in FIG. 4, the operation starts by receiving operands A, B and C (step 410). The exponents of operands A, B and C are used to determine an intermediate exponent for the operation (step 420). Operands A and C are used to generate a product AC (step 430). Operand B is provided to a leading zero counter to count the number of leading zeros in the mantissa of operand B (step 440). A first shift amount for the mantissa of B is determined based on the leading zero count (lzc count) (step 450).

The operand B is also provided to an exponent calculator for determining a second shift amount based on the exponents of operands A, B and C (step 460). A comparison of the first shift amount and the second shift amount is performed to determine which shift amount for the mantissa of operand B is to be utilized (step 470). For example, if the negative of the shift amount determined based on the exponents is less than the lzc count, then the shift amount based on the exponents is selected for use in shifting the mantissa of operand B. If the shift amount determined based on the exponents is greater than the lzc count, then the lzc count is used as a basis for shifting the mantissa of operand B. In the latter case, either the binary shift amount may be set to the negative of the lzc count or 0. Alternatively, a separate lzc shifter may be used to provide both a shifted mantissa of operand B based on the lzc count and a shifted mantissa of operand B based on the exponents of the operands to a multiplexer which selects one of these shifted mantissas for output based on a select signal from a compare/select unit.

Regardless of which embodiment is utilized, the mantissa of operand B is shifted by the determined shift amount (step 480). The shifted mantissa of operand B is then used to generate a normalized result via, for example, the main adder/incrementer/LZA, normalizer, rounder, etc. (step 490). The operation then terminates.

Figure 5:
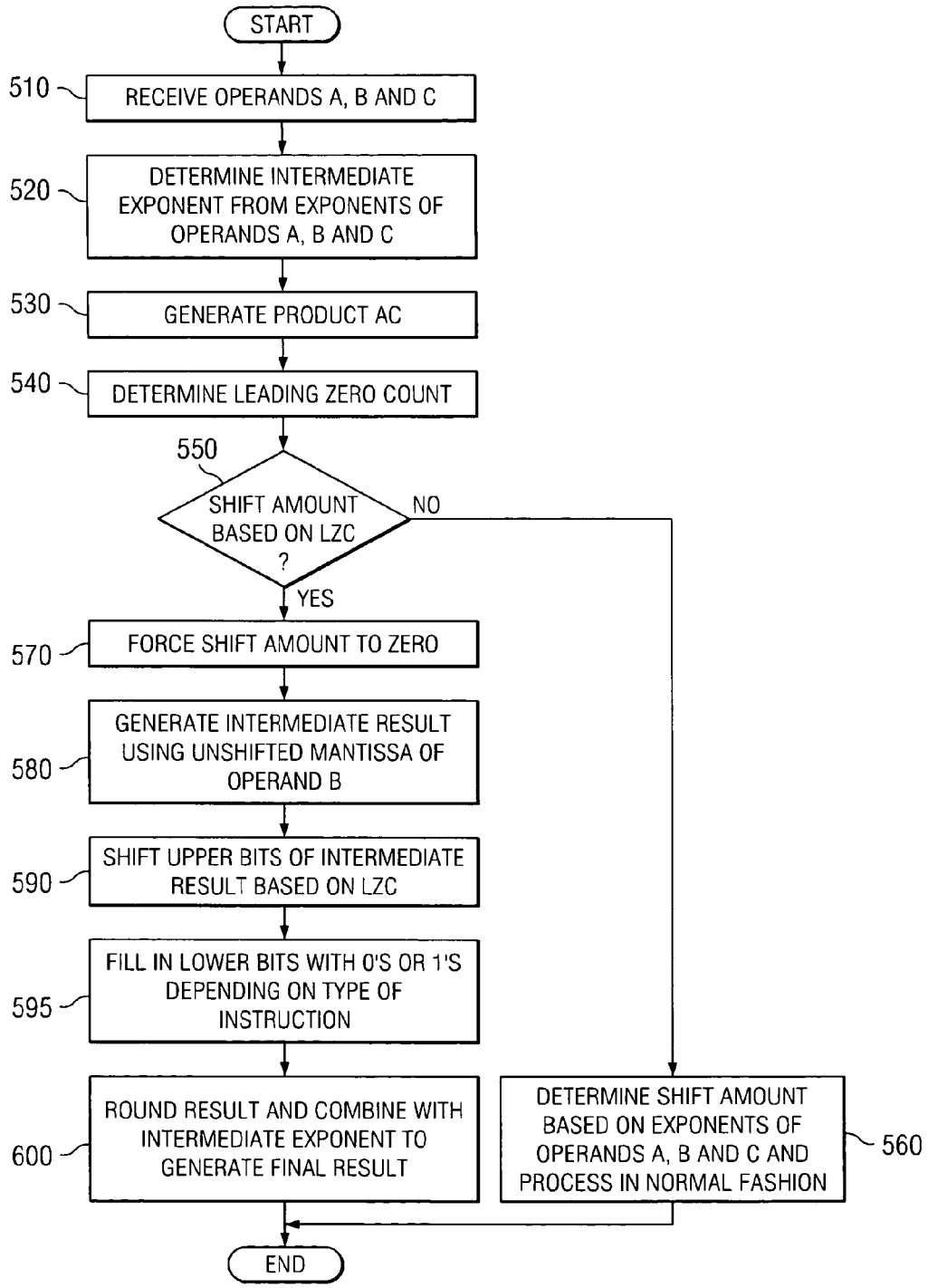
FIG. 5 is a flowchart outlining an exemplary operation of an alternative embodiment of the present invention.

FIG. 5 is a flowchart outlining an exemplary operation of an alternative embodiment of the present invention in which the shifting of the mantissa of operand B is performed at a normalization stage, i.e. when the binary shift amount is forced to zero. As shown in FIG. 5, the operation starts by receiving operands A, B and C (step 510). The exponents of operands A, B and C are used to determine an intermediate exponent for the operation (step 520). Operands A and C are used to generate a product AC (step 530). Operand B is provided to a leading zero counter to count the number of leading zeros in the mantissa of operand B (step 540).

A determination is then made as to whether a shift amount based on the number of leading zeros is to be used instead of a shift amount based on the exponents of operands A, B and C (step 550). If not, then the exponents of operands A, B and C are used to determine a shift amount for the mantissa of B and the operation continues in a normal fashion (step 560). If the leading zero count is to be used to generate the shift amount, then the alignment shift amount is forced to zero (step 570).

The unshifted mantissa of operand B is used along with the mantissa of the product AC to generate an intermediate result (step 580). The upper bits of the intermediate result are shifted by an amount determined based on the leading zero count (step 590). The lower bits are then filled with either 0's or 1's depending on the type of fused-multiply operation being performed (step 595). The result is then rounded and combined with the intermediate exponent to generate a final result (step 600). This final result may then be output along with the corresponding exponent to floating point registers for use by the microprocessor. The operation then terminates.

Thus, the present invention provides mechanisms for executing fused-multiply-add and fused-multiply-subtract instructions in a floating point pipelined dataflow. The mechanisms of the present invention eliminates the need to pre-normalize input operands thereby eliminating the need to stop the execution pipeline using stalls, traps or flushes. As a result, such instructions may be processed more efficiently and quickly using the mechanisms of the present invention.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for processing an instruction having denormal floating point operands, comprising:
   a multiplier;
   first, second and third input lines for inputting a first operand, a second operand, and a third operand of the instruction;
   an alignment shifter coupled to the second input line;
   an exponent calculator coupled to the first, second and third input lines, wherein the exponent calculator receives an exponent portion of the first operand, the second operand, and the third operand via the first, second and third input lines;
   a compare/select unit coupled to the exponent calculator; and
   a leading zero counter coupled to the second input line and to the compare/select unit, wherein the alignment shifter receives the mantissa of the second operand via the second input line, and wherein:
   the leading zero counter determines a first shift amount of the mantissa of the second operand based on a number of leading zeros in the mantissa of the second operand,
   the exponent calculator determines a second shift amount of the mantissa of the second operand based on exponents of the first operand, the second operand, and the third operand,
   the compare/select unit compares the first shift amount to the second shift amount,
   the compare/select unit determines if a negative value of the second shift amount is less than the first shift amount,
   the compare/select unit sets the third shift amount equal to the second shift amount if the negative value of the second shift amount is less than the first shift amount,
   the compare/select unit sets the third shift amount equal to the first shift amount if the negative value of the second shift amount is not less than the first shift amount, and
   the alignment shifter shifts the mantissa of the second operand by the third shift amount and the shifted mantissa of the second operand is normalized to generate a normalized result for the instruction,
   wherein generating a normalized result for the instruction based on the shifted mantissa of the second operand and a product of the first and third operands comprises:
   generating an intermediate result based on the shifted mantissa of the second operand and the product of the first and third operands;

generating a normalize shift amount based on the third shift amount, wherein the normalize shift amount is the sum of the third shift amount and the number of leading zeros of the mantissa of the second operand; and normalizing the intermediate result based on the normalize shift amount.

2. The system of claim 1, wherein the instruction is one of a fused-multiply-add and a fused-multiply-subtract instruction.

3. The system of claim 1, further comprising:

a rounder unit; and floating point registers coupled to the rounder unit, wherein the rounder unit receives an intermediate exponent from the exponent calculator and the normalized result and generates a rounded result of the instruction which is provided to the floating point registers.

\* \* \* \* \*